(12) United States Patent
Hirschmann et al.

(10) Patent No.: US 6,555,186 B2
(45) Date of Patent: Apr. 29, 2003

(54) TN AND STN LIQUID-CRYSTAL DISPLAYS

(75) Inventors: Harald Hirschmann, Darmstadt (DE);
Martina Weidner, Münster (DE); Sven Schupfer, Aschaffenburg (DE); Peer Kirsch, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 09/883,356

(22) Filed: Jun. 19, 2001

(65) Prior Publication Data
US 2002/0064607 A1 May 30, 2002

(30) Foreign Application Priority Data

Jun. 23, 2000 (DE) .......................... 100 30 666

(51) Int. Cl.[7] .................. C09K 19/20; C09K 19/30; G02F 1/133
(52) U.S. Cl. .............. 428/1.1; 252/299.63; 252/299.67; 349/186
(58) Field of Search ................. 252/299.67, 299.63; 428/1.1; 349/179, 186

(56) References Cited

U.S. PATENT DOCUMENTS 5,308,538 A * 5/1994 Weber et al. ......... 252/299.61

FOREIGN PATENT DOCUMENTS

DE 19906254 * 9/1999

OTHER PUBLICATIONS

Caplus 1991: 112292*
English Eqlvanent Abstract for DE 19906254, Sep. 16, 1999.

* cited by examiner

*Primary Examiner*—Shean C. Wu
(74) *Attorney, Agent, or Firm*—Millen, White, Zelano & Branigan, P.C.

(57) ABSTRACT

The invention relates to TN and STN liquid-crystal displays and to the novel nematic liquid-crystal mixtures used therein, characterized in that they comprise one or more compounds of the formula I

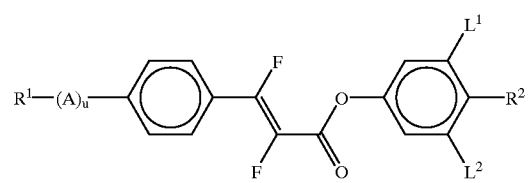

in which $R^1$, $R^2$, A, u, $L^1$ and $L^2$ are as defined herein.

18 Claims, No Drawings

TN AND STN LIQUID-CRYSTAL DISPLAYS

The invention relates to twisted nematic (TN) and supertwisted nematic (STN) liquid-crystal displays having very short response times and good steepnesses and angle dependencies, and to the novel nematic liquid-crystal mixtures used therein.

TN displays are known, for example from M. Schadt and W. Helfrich, Appl. Phys. Lett., 18,127 (1971). STN displays are known, for example from EP 0 131 216 B1; DE 34 23 993 A1; EP 0 098 070 A2; M. Schadt and F. Leenhouts, 17th Freiburg Congress on Liquid Crystals (8.-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1–8 (1986). The term STN here covers any relatively highly twisted display element having a twist angle with a value of between 160° and 360°, such as, for example, the display elements according to Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236, DST-LCDs (EP-A 0 246 842) or BW-STN-LCDs (K. Kawasaki et al., SID 87 Digest 391 (20.6)).

STN displays are distinguished compared with standard TN displays by significantly better steepnesses of the electro-optical characteristic line and, at moderate and relatively high multiplex rates, for example from 32 to 64 or higher, by better contrast values. On the other hand, the contrast in TN displays is generally higher owing to the better dark value and the angle dependence of the contrast is less than in STN displays with low multiplex rates of, for example, less than 32.

Of particular interest are TN and STN displays having very short response times, in particular also at relatively low temperatures. In order to achieve short response times, the rotational viscosities of the liquid-crystal mixtures have hitherto been optimized using mostly monotropic additives having relatively high vapour pressure. However, the response times achieved were not adequate for every application.

In order to achieve a steep electro-optical characteristic line in the displays according to the invention, the liquid-crystal mixtures should have relatively large values for the ratio between the elastic constants $K_{33}/K_{11}$ and relatively small values for $\Delta\epsilon/\epsilon_\perp$, where $\Delta\epsilon$ is the dielectric anisotropy and $\epsilon_{195}$ is the dielectric constant perpendicular to the longitudinal molecular axis.

In addition to optimization of the contrast and response times, further important requirements are made of mixtures of this type:
1. broad d/p window
2. high long-term chemical stability
3. high electrical resistance
4. low frequency and temperature dependence of the threshold voltage.

The parameter combinations achieved are still far from adequate, in particular for high-multiplex STN displays (with a multiplex rate in the region of about 1/400), but also for medium- and low-multiplex STN displays (with multiplex rates in the region of about 1/64 and 1/16 respectively), and TN displays. This is partly attributable to the fact that the various requirements are affected in opposite manners by material parameters.

Thus, a reduction in the operating voltage/threshold voltage in mixtures for TN and STN displays generally results in a significant increase in the response time. In addition, it has been found that a specific variation of the mixture components in order to improve the steepness and reduce the threshold voltage simultaneously has an adverse effect on the clearing point and the birefringence.

In addition, the known TN and STN displays often exhibit a strong temperature dependence of the operating voltage.

Thus, there continues to be a great demand for TN and STN displays, in particular for high-resolution displays (XGA), having high characteristic-line steepness and low threshold voltage at the same time as a large working-temperature range and favorable birefringence values, very short response times, low temperature dependence of the operating voltage and good angle dependence of the contrast which meet the above-mentioned requirements.

Among the objects of the invention is providing TN and STN displays which do not have the above-mentioned disadvantages or only do so to a lesser extent and at the same time have short response times, in particular at low temperatures, and very good steepnesses and improved temperature dependence of the operating voltage owing to improved frequency dependence of the dielectric constants.

Upon further study of the specification and appended claims, further objects and advantages of this invention will become apparent to those skilled in the art.

It has been found that objects of the invention may be achieved if use is made of nematic liquid-crystal mixtures which comprise one or more compounds of the formula I

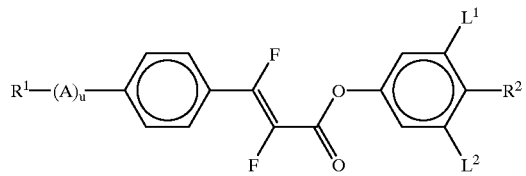

in which
$R^1$ is an alkyl or alkenyl radical having 1 to 12 carbon atoms which is unsubstituted, monosubstituted by CN or $CF_3$ or monosubstituted to per halo-substituted by halogen and in which, in addition, one or two $CH_2$ groups may be replaced by —O—, —S—,

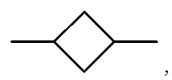

—CO—O—, —O—CO— or —O—CO—O— in such a way that 0 atoms are not linked directly to one another,
$R^2$ has one of the meanings indicated for $R^1$ or is X,
X is F, Cl, CN, OCN, NCS, SCN, or a halogenated alkyl, alkenyl, alkoxy or alkenyloxy radical having 1 to 6 carbon atoms, in particular $OCF_3$ or $OCHF_2$,
$L^1$ and $L^2$ are each, independently of one another, H or F,
A is trans-1,4-cyclohexylene, 1,4-phenylene, 3-fluoro-1,4-phenylene, 2,3-difluoro-1,4-phenylene, 3,5-difluoro-1,4-phenylene or 1,3-dioxane-2,5-diyl, and
u is 1 or 1.

The use of the compounds of the formula I in the mixtures for TN and STN displays according to the invention results in lower values for the threshold voltage and improved steepness values without a significant change in the clearing point and birefringence, low temperature dependence of the operating voltage and threshold voltage, and very fast response times, in particular at low temperatures.

The compounds of the formula I enable, in particular, a reduction in the threshold voltage and operating voltage of TN and STN displays without significantly impairing the response times or, in the favorable case, even with retention or shortening of the response times.

The mixtures according to the invention are furthermore preferably distinguished by the following advantages:

they have low viscosity, they have a low threshold voltage and operating voltage, and they effect long shelf lives in the LC display at low temperatures.

The invention includes liquid-crystal displays having two outer plates, which, together with a frame, form a cell, a nematic liquid-crystal mixture of positive dielectric anisotropy located in the cell, electrode layers with alignment layers on the insides of the outer plates, a tilt angle between the longitudinal axis of the molecules at the surface of the outer plates and the outer plates of from 0 degree to 30 degrees, and a twist angle of the liquid-crystal mixture in the cell from alignment layer to alignment layer with a value of between 22.5° and 600°, a nematic liquid-crystal mixture consisting of a) 15–80% by weight of a liquid-crystalline component A consisting of one or more compounds having a dielectric anisotropy of greater than +1.5;

b) 20–85% by weight of a liquid-crystalline component B consisting of one or more compounds having a dielectric anisotropy of between −1.5 and +1.5;

c) 0–20% by weight of a liquid-crystalline component D consisting of one or more compounds having a dielectric anisotropy of below −1.5, and d) if desired, an optically active component C in such an amount that the ratio between the layer thickness (separation of the outer plates) and the natural pitch of the chiral nematic liquid-crystal mixture is from about 0.2 to 1.3, characterised in that component A comprises at least one compound of the formula I

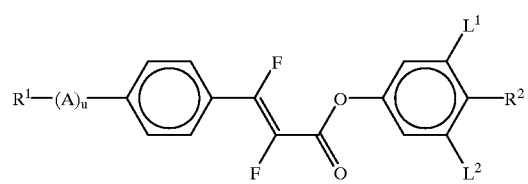

I in which $R^1$ is an alkyl or alkenyl radical having 1 to 12 carbon atoms which is unsubstituted, monosubstituted by CN or $CF_3$ or monosubstituted to per halo-substituted by halogen and in which, in addition, one or two $CH_2$ groups may be replaced by —O—, —S—,

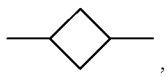

—CO—, —CO—O—, —O—CO— or —O—CO—O— in such a way that O atoms are not linked directly to one another, $R^2$ has one of the meanings indicated for $R^1$ or is X, X is F, Cl, CN, OCN, NCS, SCN or a halogenated alkyl, alkenyl, alkoxy or alkenyloxy radical having 1 to 6 carbon atoms, in particular $OCF_3$ or $OCHF_2$, $L^1$ and $L^2$ are each, independently of one another, H or F, A is trans-1,4-cyclohexylene, 1,4-phenylene, 3-fluoro-1,4-phenylene, 2,3-difluoro-1,4-phenylene, 3,5-difluoro-1,4-phenylene or 1,3-dioxane-2,5-diyl, and u is 0 or 1.

The invention also relates to the described liquid-crystal mixtures for use in TN and STN displays, in particular in medium- and low-multiplexed STN displays.

$R^1$ and $R^2$ are preferably straight-chain alkyl or alkoxy having 1 to 8 carbon atoms or straight-chain alkenyl having 2 to 7 carbon atoms, in particular straight-chain alkyl having 1 to 8 carbon atoms.

If $R^2$ has one of the meanings indicated for $R^1$, $L^1$ and $L^2$ are preferably H.

In a further preferred embodiment, $R^2$ is X as indicated in the formula I, where X is preferably F, Cl, CN, $CF_3$, $OCF_3$, $CHF_2$, $OCHF_2$, $OCFHCF_3$, $OCFHCHF_2$, $OCF_2CH_3$, $OCF_2CHF_2$ or $CH=CHF_2$, in particular F, CN, $OCF_3$ or $OCHF_2$.

A is preferably trans-1,4-cyclohexylene, 1,4-phenylene, 3-fluoro-1,4-phenylene or 3,5-difluoro-1,4-phenylene, in particular trans-1,4-cyclohexylene or 1,4-phenylene.

Particular preference is given to the following compounds:

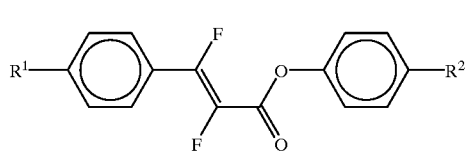

I1

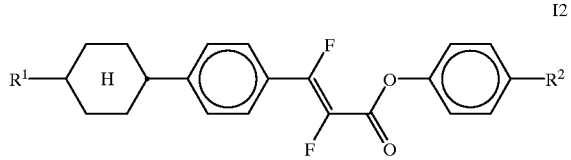

I2

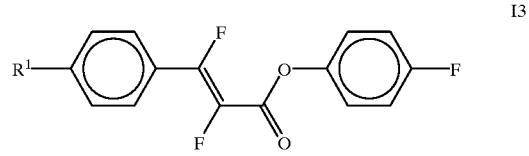

I3

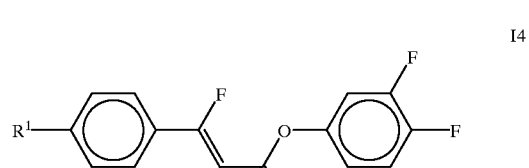

I4

-continued

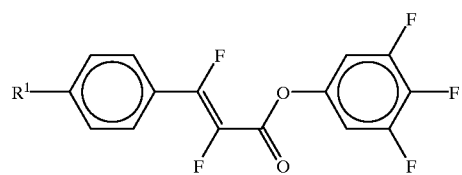
I5

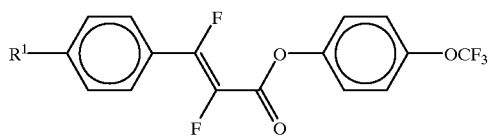
I6

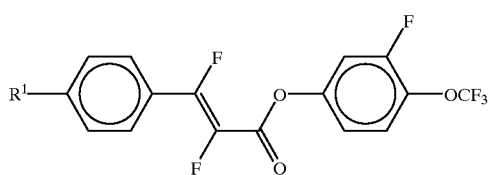
I7

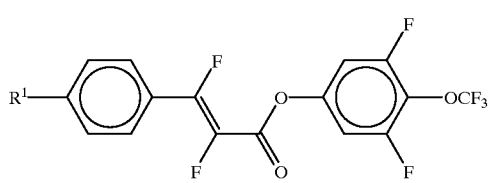
I8

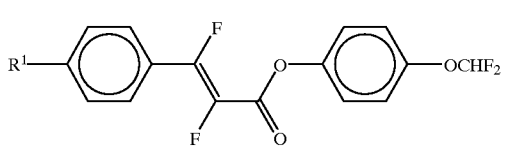
I9

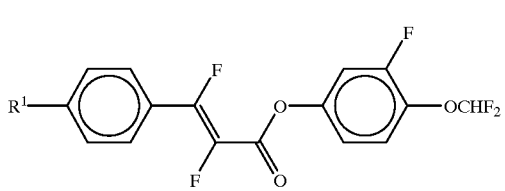
I10

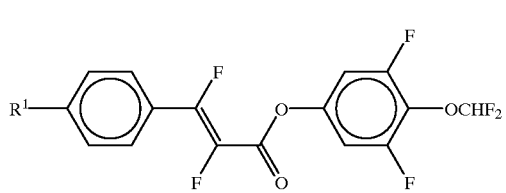
I11

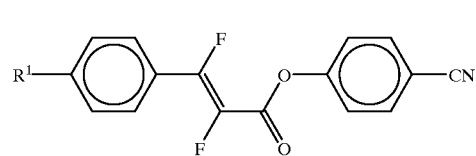
I12

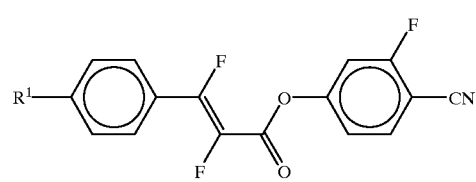
I13

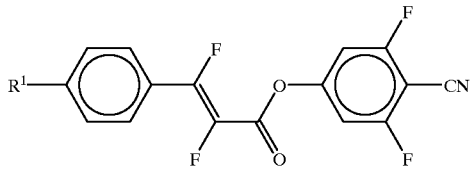
I14

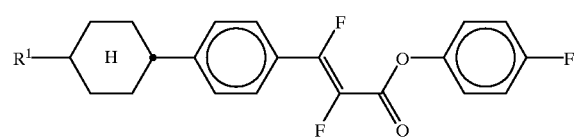
I15

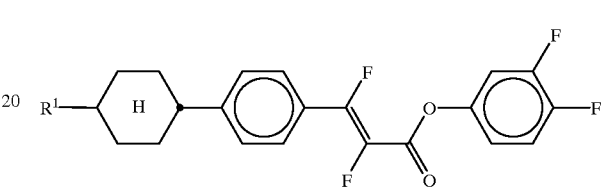
I16

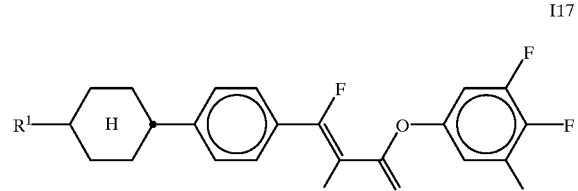
I17 in which $R^1$ and R are as defined in the formula I.

Particular preference is given to compounds of the formulae I1, I2, I5, $I_8$ and I12.

Besides the compounds of the formula I, the medium preferably comprises one or more alkenyl compounds of the formula II

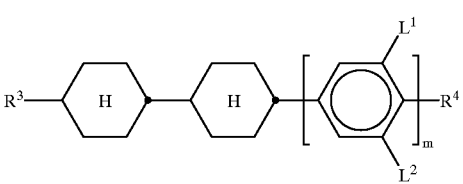
II in which $R^3$ is an alkenyl group having 2 to 7 carbon atoms,
$R^4$ has one of the meanings indicated for $R^1$ or is Q—Y,
Q is $CF_2$, $OCF_2$, CFH, OCFH or a single bond,
Y is F or Cl,
$L^1$ and $L^2$ are each, independently of one another, H or F, and
m is 0 or 1.

Formula II includes the following compounds:

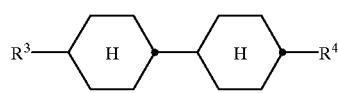
II-1

II-2

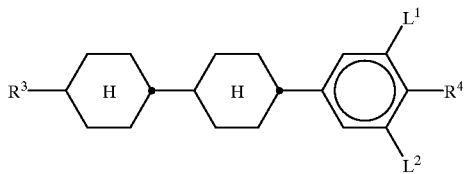

II-3

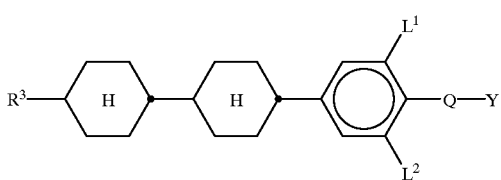

in which $R^3$, $R^4$, Q, Y, $L^1$ and $L^2$ are as defined above.

Particular preference is given to TN and STN displays according to the invention which contain at least one compound of the formula II-1.

Preference is furthermore given to TN and STN displays which contain at least one compound of the formula II-1 and at least one compound of the formula II-3.

In the formula II-2, $L^1$ and $L^2$ are preferably H.

In the formulae II-1 to II-3, $R^3$ is particularly preferably 1E-alkenyl or 3E-alkenyl having 2 to 7 carbon atoms.

Particularly preferred compounds of the formula II-1 are those in which $R^4$ is alkenyl having 2 to 7 carbon atoms, and compounds selected from the formulae II-1a to II-1e:

II-1a

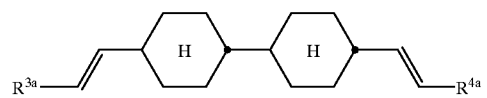

II-1b

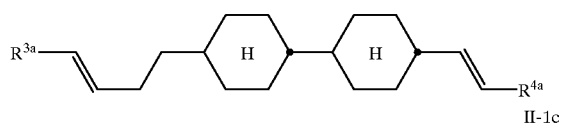

II-1c

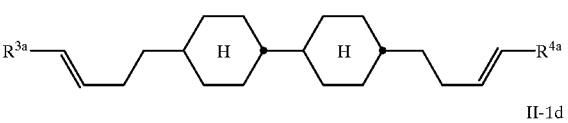

II-1d

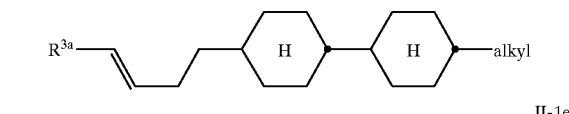

II-1e

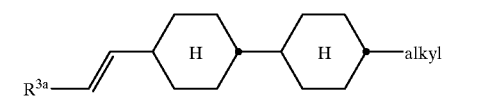

in which $R^{3a}$ and $R^{4a}$ are each, independently of one another, H, $CH_3$, $C_2H_5$ or n-$C_3H_7$, and alkyl is an alkyl group having 1 to 8 carbon atoms.

Particular preference is given to compounds of the formula II-1a, in particular those in which $R^{3a}$ and $R^{4a}$ are $CH_3$, and compounds of the formula II-1e in which $R^{3a}$ is H.

Particular preference is given to TN and STN displays according to the invention in which the liquid-crystal mixture comprises at least one compound of the formula II-1a and/or II-1c in which $R^{3a}$ and $R^{4a}$ each have the same meaning, and to displays in which the liquid-crystal mixture comprises at least one compound of the formula II-1e.

In a further preferred embodiment, the TN and STN displays according to the invention contain one or more compounds of the formula II-2.

Particular preference is given to compounds of the formula II-2 in which $R^4$ is alkyl having 1 to 8 carbon atoms, in particular 1, 2 or 3 carbon atoms, and $R^3$ is 1E-alkenyl or 3E-alkenyl having 2 to 7 carbon atoms, in particular 2, 3 or 4 carbon atoms, and to compounds selected from the formulae II-2a and II-2b:

II-2a

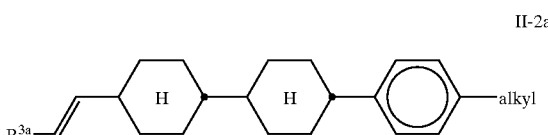

II-2b

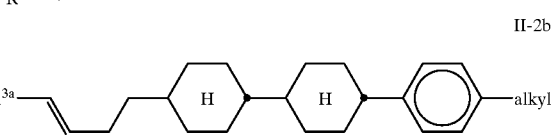

in which $R^{3a}$ is H, $CH_3$, $C_2H_5$ or n-$C_3H_7$, in particular H, and alkyl is an alkyl group having 1 to 8 carbon atoms, in particular 1, 2 or 3 carbon atoms.

Particularly preferred compounds of the formula II-3 are those in which $L^1$ and/or $L^2$ is F and Q—Y is F or $OCF_3$. Preference is furthermore given to compounds of the formula II-3 in which $R^3$ is 1E-alkenyl or 3E-alkenyl having 2 to 7 carbon atoms, in particular 2, 3 or 4 carbon atoms.

The compounds of the formulae II-1 and II-2 having a dielectric anisotropy of between −1.5 and +1.5 are to be assigned to component B. The polar compounds of the formula II-3 having a dielectric anisotropy of greater than +1.5 are to be assigned to component A.

The use of compounds of the formula II in the liquid-crystal mixtures according to the invention results in particularly low values for the rotational viscosity and in TN and STN displays having high steepness and fast response times, in particular at low temperatures.

The compounds of the formula II have low viscosities, in particular low rotational viscosities, and low values for the ratio between the elastic constants $K_{33}/K_{11}$, and therefore result in short response times in the displays according to the invention, while the presence of compounds of the formula I of high dielectric anisotropy, in particular in increased concentrations, causes a reduction in the threshold voltage.

Component A preferably further comprises one or more cyano compounds of the following formulae:

IIIa

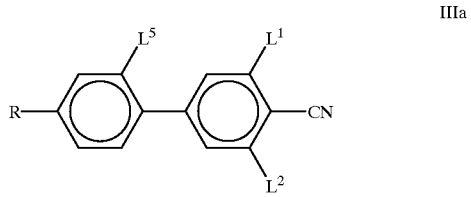

-continued

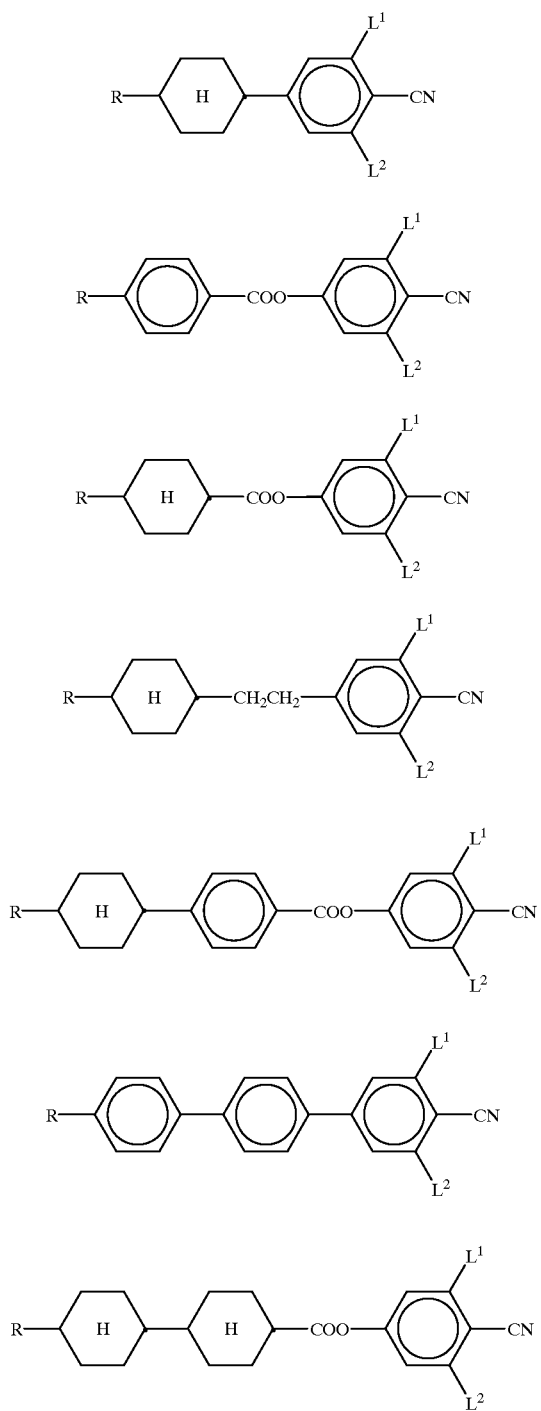

In a specific embodiment, component A preferably comprises one or more 3,4,5-trifluorophenyl compounds of the following formulae:

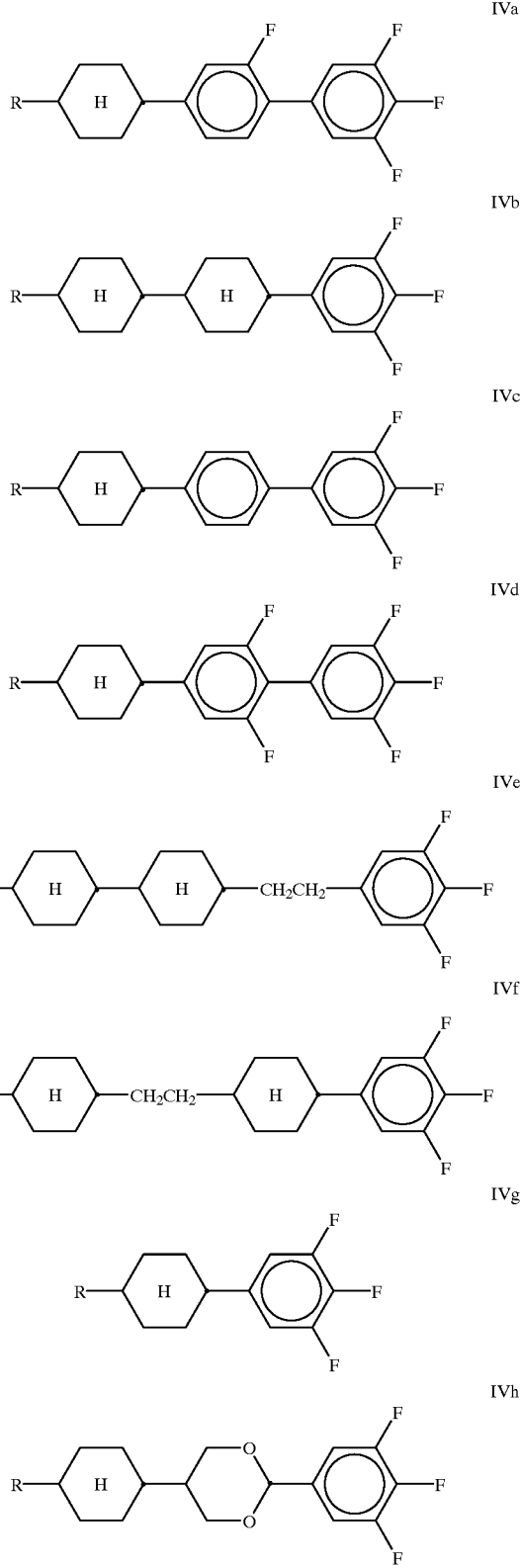

in which R has one of the meanings given for $R^1$ in the formula I, and $L^1$, $L^2$ and $L^5$ are each, independently of one another, H or F. R in these compounds is particularly preferably alkyl or alkoxy having 1 to 8 carbon atoms.

Particular preference is given to mixtures which comprise one or more compounds of the formulae IIIb, IIIc and IIIf, in particular those in which $L^1$ and/or $L^2$ is F.

Preference is furthermore given to mixtures which comprise one or more compounds of the formula IIIh in which $L^2$ is H and $L^1$ is H or F, in particular F.

and optionally one or more compounds containing a polar end group, of the following formulae:

Va
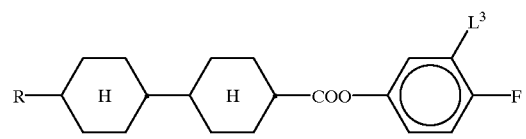
Vk
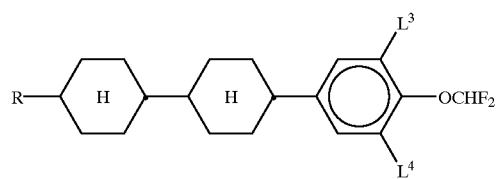
Vb
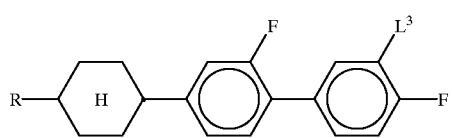
Vm
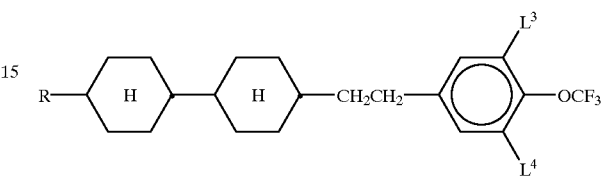
Vc
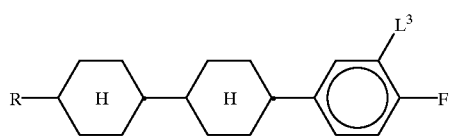
Vn
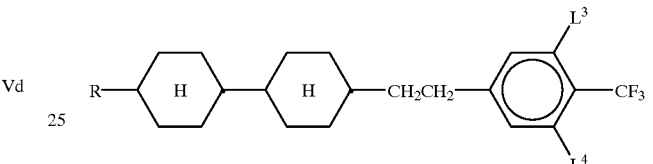
Vd
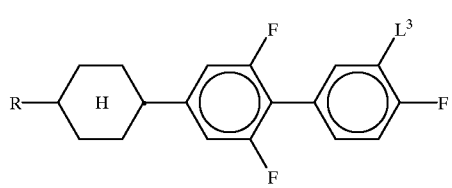
Vo
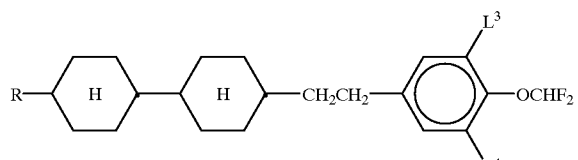
Ve
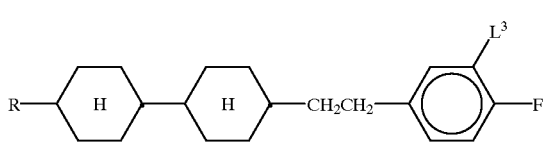
Vp
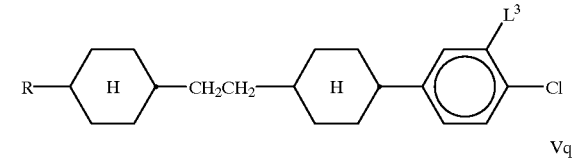
Vf
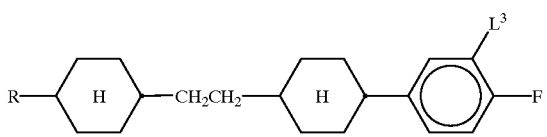
Vq
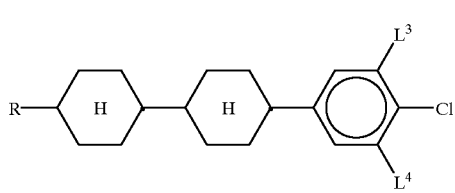
Vg
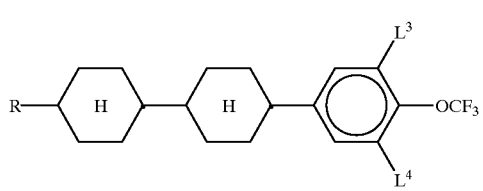
Vr
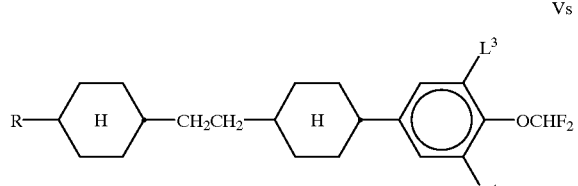
Vh
Vs
Vi in which R has one of the meanings given for $R^1$ in the formula I, and $L^3$ and $L^4$ are each, independently of one another, H or F. R in these compounds is particularly preferably alkyl or alkoxy having 1 to 8 carbon atoms.

Particular preference is given to compounds of the formulae IVa, IVb, IVc, IVd, IVh and Vi, in particular compounds of the formulae IVa, IVh and Vi.

Besides the compounds of the formulae I and II, the mixtures according to the invention preferably comprise one or more liquid-crystalline tolan compounds. Owing to the high birefringence Δn of the tolan compounds, small layer thicknesses can be used, resulting in a significant shortening in the response times. The tolan compounds are preferably selected from the group consisting of Ta to Th:

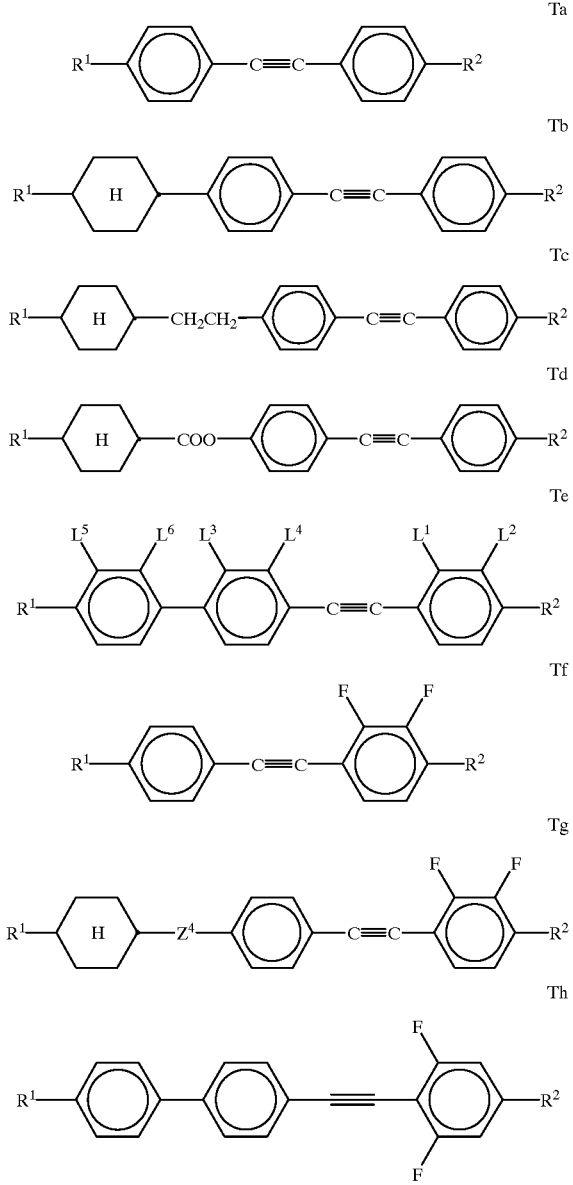

in which
$R^1$ is as defined in the formula I,
$R^2$ has one of the meanings indicated for $R^1$,
$Z^4$ is —CO—O—, —CH$_2$CH$_2$— or a single bond, and
$L^1$ to $L^6$ are each, independently of one another, H or F.

Particular preference is given to compounds of the formula Th.

In a further preferred embodiment, the mixtures comprise one or more compounds of the formulae Ta and/or Tb.

Particularly preferred compounds of the formula Te are those in which one, two or three of the radicals $L^1$ to $L^6$ are F and the others are H, where $L^1$ and $L^2$ or $L^3$ and $L^4$ or $L^5$ and $L^6$ are not both simultaneously F.

The proportion of the compounds from the group comprising Ta and Tb is preferably from 5 to 50%, in particular from 10 to 40%.

The proportion of the compounds of the formula Th is preferably from 2 to 35%, in particular from 4 to 25%.

The proportion of the compounds of the formulae Ta to Th is preferably from 2 to 55%, in particular from 5 to 35%.

Preferred liquid-crystal mixtures comprise one or more compounds of component A, preferably in a proportion of from 15% to 80%, particularly preferably from 20% to 70%. These compounds have a dielectric anisotropy Δε≧+3, in particular Δε≧+8, particularly preferably Δε≧+12.

Preferred liquid-crystal mixtures comprise one or more compounds of component B, preferably in a proportion of from 20 to 85%, particularly preferably in a proportion of from 30 to 75%. The compounds from group B, in particular those containing alkenyl groups, are distinguished, in particular, by their low values for the rotational viscosity $\epsilon_1$.

Besides one or more compounds of the formula II, component B preferably comprises one or more compounds selected from the group consisting of the bicyclic compounds of the following formulae:

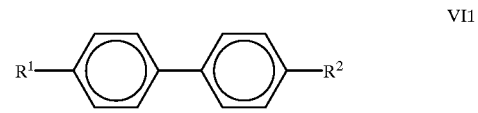

VI1

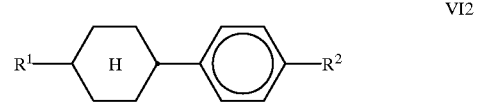

VI2

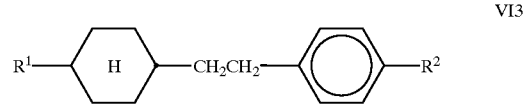

VI3

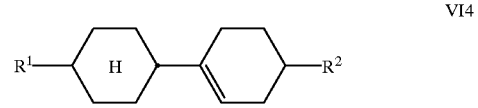

VI4

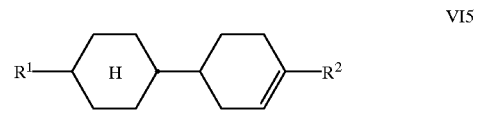

VI5

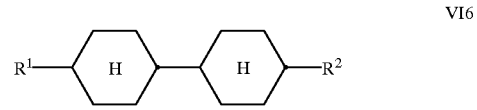

VI6

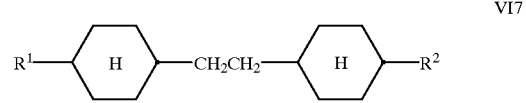

VI7

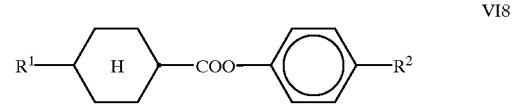

VI8

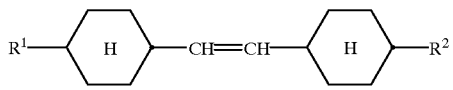
VI9
and/or one or more compounds selected from the group consisting of the tricyclic compounds of the following formulae:
VI10
VI11
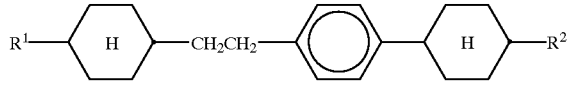
VI12
VI13
VI14
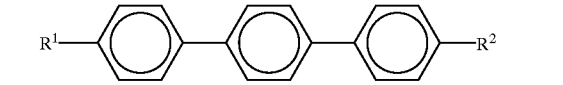
VI15
VI16
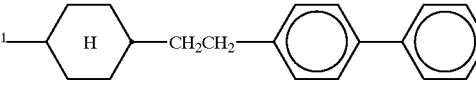
VI17
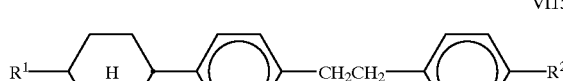
VI18
VI19
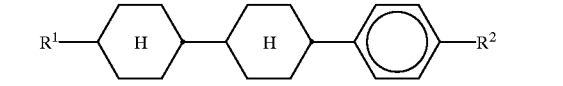
VI20
VI21
VI22
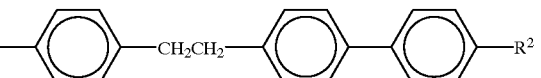
VI23
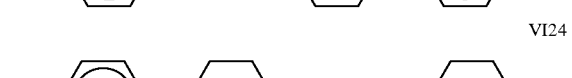
VI24
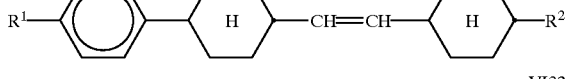
VI32
VI33
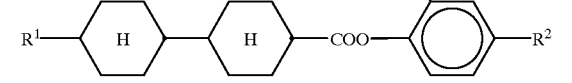
and/or one or more compounds selected from the group consisting of the tetracyclic compounds of the following formulae:
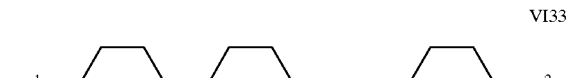
VI25
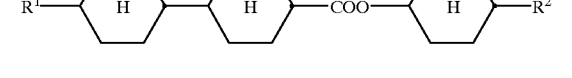
VI26
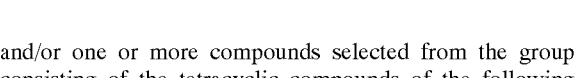
VI27
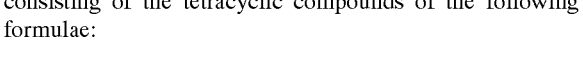
VI28
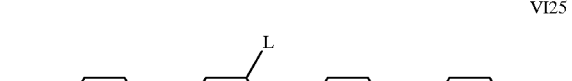
VI29
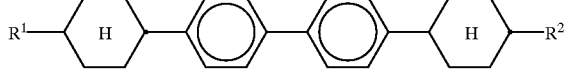
VI30
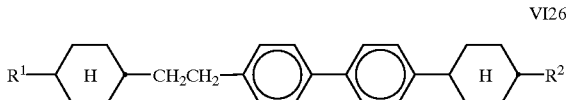

-continued

VI31

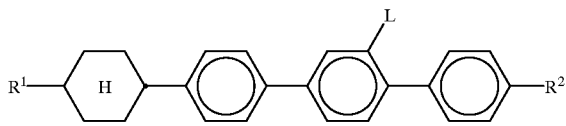

in which $R^1$ and R are as defined above, L is H or F, and the 1,4-phenylene groups in VI10 to VI19 and VI23 to VI32 may each, independently of one another, also be monosubstituted or polysubstituted by fluorine.

Particular preference is given to compounds of the formulae VI25 to VI31 in which $R^1$ is alkyl and $R^2$ is alkyl or alkoxy, in particular alkoxy, in each case having 1 to 7 carbon atoms. Preference is furthermore given to compounds of the formulae VI25 and VI31 in which L is F.

Very particular preference is given to compounds of the formulae VI25 and VI127.

$R^1$ and $R^2$ in the compounds of the formulae VI1 to VI30 are particularly preferably straight-chain alkyl or alkoxy having 1 to 12 carbon atoms.

The liquid-crystalline mixtures optionally comprise an optically active component C in such an amount that the ratio between the layer thickness (separation of the outer plates) and the natural pitch of the chiral nematic liquid-crystal mixture is greater than 0.2. For the component, a multiplicity of chiral dopants, some of which are commercially available, is available to the person skilled in the art, for example such as cholesteryl nonanoate, S-811 from Merck KGaA, Darmstadt, and CB15 (BDH, Poole, UK). The choice of dopants is not crucial per se.

The proportion of the compounds of component C is preferably from 0 to 10%, in particular from 0 to 5%, particularly preferably from 0 to 3%.

The mixtures according to the invention may also optionally comprise up to 20% of one or more compounds having a dielectric anisotropy of below −2 (component D).

If the mixtures comprise compounds of component D, these are preferably one or more compounds containing the structural unit 2,3-difluoro-1,4-phenylene, for example compounds in accordance with DE-A 38 07 801, 38 07 861, 38 07 863, 38 07 864 or 38 07 908. Particular preference is given to tolans containing this structural unit in accordance with International Patent Application PCT/DE 88/00133.

Further known compounds of component D are, for example, derivatives of the 2,3-dicyanohydroquinones or cyclohexane derivatives containing the structural unit

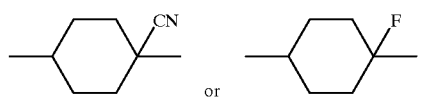

in accordance with DE-A3231 707or DE-A3407013.

The liquid-crystal displays according to the invention preferably contain no compounds of component D.

The term "alkenyl" in the definition of R, $R^1$, $R^2$, $R^3$ and $R^4$ covers straight-chain and branched alkenyl groups, in the case of R, $R^1$ and $R^2$ having 2–12 carbon atoms, in the case of $R^3$ and $R^4$ having 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl, and $C_7$-6-alkenyl, in particular $C_2$–$C_7$-1E-alkenyl, $C_4$–$C_7$-3E-alkenyl and $C_5$–$C_7$-4-alkenyl.

Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The individual compounds of the formulae I, II, III, IV, V, VI and T or their sub-formulae or also other compounds which can be used in the TN and STN displays according to the invention are either known or can be prepared by methods known per se, as described in the literature, for example in the standard works, such as Houben-Weyl, Methoden der organischen Chemie [Methods of Organic Chemistry], Georg-Thieme-Verlag, Stuttgart, to be precise under reaction conditions which are known and suitable for the said reactions. Use may also be made here of variants which are known per se, but are not mentioned here in greater detail.

Some of the compounds of the formula I are described in DE 199 06 254 A1, but not in the mixtures as described herein.

In particularly preferred embodiments, the mixtures comprise one or more compounds of the formula I in which u is 0, one or more compounds of the formula I in which $L^1$ and $L^2$ are H and $R^2$ is straight-chain alkyl or alkoxy having 1 to 8 carbon atoms, one or more compounds of the formula I in which $R^2$ is F, CN, $OCF_3$ or $OCHF_2$ and $L^1$ and/or $L^2$, preferably $L^1$ and $L^2$, are F, one or more compounds of the formulae I1, I2 or I14, from 2 to 30%, in particular from 5 to 15%, of one or more compounds of the formula I, from 15 to 70%, in particular from 20 to 60%, of one or more alkenyl compounds of the formula II, at least one compound of the formula II-1a and/or II-3, at least two compounds of the formula IIIc, and optionally in addition at least one compound of the formula IIIb in which $L^1$ and/or $L^2$ is F. The proportion of these compounds in the liquid-crystal mixtures is preferably from 7 to 50%, in particular from 10 to 40%;

at least one compound selected from the following group:

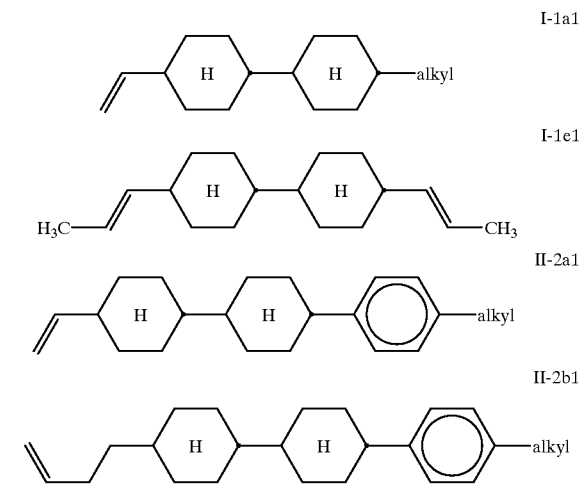

-continued

II-3a

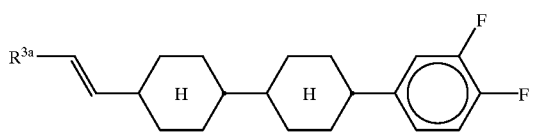

in which alkyl is an alkyl group having 1 to 8 carbon atoms, and $R^{3a}$ is H or $CH_3$,
one or more, particularly one, two or three, tolan compounds of the formula T2a and/or T2b,
one or more tolan compounds of the formula T2h,
one or more compounds of the formulae VI25 and VI27, where L in the formula VI25 is H or F, particularly preferably F. The proportion of these compounds in the liquid-crystal mixtures is preferably from 10 to 45%, in particular from 15 to 40%,
more than 20% of compounds of positive dielectric anisotropy, in particular having $\Delta\epsilon \geq +12$.

The mixtures according to the invention are distinguished, in particular on use in TN and STN displays of high layer thicknesses, by very low total response times ($t_{tot}=t_{on}+t_{off}$).

The liquid-crystal mixtures used in the TN and STN cells according to the invention are dielectrically positive, with $\Delta\epsilon \geq 1$. Particular preference is given to liquid-crystal mixtures with $\Delta\epsilon \geq 3$, in particular with $\Delta\epsilon \geq 5$.

The liquid-crystal mixtures according to the invention have favorable values for the threshold voltage $V_{10/0/20}$ and for the rotational viscosity $\gamma_1$. If the value for the optical path difference d·Δn is pre-specified, the value for the layer thickness d is determined by the optical anisotropy Δn. In particular at relatively high values for d·Δn, the use of liquid-crystal mixtures according to the invention having a relatively high value for the optical anisotropy is generally preferred, since the value for d can then be selected to be relatively small, which results in more favorable values for the response times. However, liquid-crystal displays according to the invention which contain liquid-crystal mixtures according to the invention with smaller values for Δn are also characterised by advantageous values for the response times.

The liquid-crystal mixtures according to the invention are furthermore characterised by advantageous values for the steepness of the electro-optical characteristic line, and can be operated with high multiplex rates, in particular at temperatures above 20° C. In addition, the liquid-crystal mixtures according to the invention have high stability and favorable values for the electrical resistance and the frequency dependence of the threshold voltage. The liquid-crystal displays according to the invention have a large working-temperature range and good angle dependence of the contrast.

The construction of the liquid-crystal display elements according to the invention from polarizers, electrode base plates and electrodes having a surface treatment such that the preferential alignment (director) of the liquid-crystal molecules in each case adjacent thereto is usually twisted by a value of from 160° to 720° from one electrode to the other corresponds to the usual structure for display elements of this type. The term "usual structure" here is broadly drawn and also covers all derivatives and modifications of the TN and STN cell, in particular also matrix display elements and display elements containing additional magnets.

The surface tilt angle at the two outer plates may be identical or different. Identical tilt angles are preferred. Preferred TN displays have pretilt angles between the longitudinal axis of the molecules at the surface of the outer plates and the outer plates of from 0° to 7°, preferably from 0.01° to 5°, in particular from 0.1 to 2°. In the STN displays, the pretilt angle is from 1° to 30°, preferably from 1° to 12° and in particular from 3° to 10°.

The twist angle of the TN mixture in the cell has a value of between 22.5° and 170°, preferably between 45° and 130° and in particular between 80° and 115°. The twist angle of the STN mixture in the cell from alignment layer to alignment layer has a value of between 100° and 600°, preferably between 170° and 300° and in particular between 180° and 270°.

The liquid-crystal mixtures which can be used in accordance with the invention are prepared in a manner which is conventional per se. In general, the desired amount of the components used in lesser amount are dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives which are known to the person skilled in the art and are described in the literature. For example, 0–15% of pleochroic dyes may be added.

The entire disclosure of all applications, patents and publications, cited above, and of corresponding German Application No. 10030666.7, filed Jun. 23, 2000, is hereby incorporated by reference.

EXAMPLES

In the present application and in the examples below, the structures of the liquid-crystal compounds are indicated by means of acronyms, the transformation into chemical formulae taking place in accordance with Tables A and B. All radicals $C_nH_{2n+1}$ and $C_mH_{2m+1}$ are straight-chain alkyl radicals having n and m carbon atoms respectively. The alkenyl radicals have the trans-configuration. The coding in Table B is self-evident. In Table A, only the acronym for the parent structure is indicated. In individual cases, the acronym for the parent structure is followed, separated by a dash, by the code indicated in the table below for the substituents $R^1$, $R^2$, $L^1$, $L^2$ and $L^3$.

| Code for $R^1$, $R^1$ $R^2$, $L^1$, $L^2$, $L^3$ | | $R^2$ | $L^1$ | $L^2$ | $L^3$ |
|---|---|---|---|---|---|
| Nm | $C_nH_{2n+1}$ | $C_mH_{2m+1}$ | H | H | H |
| NOm | $OC_nH_{2n+1}$ | $C_mH_{2m+1}$ | H | H | H |
| nO.m | $C_nH_{2n+1}$ | $OC_mH_{2m+1}$ | H | H | H |
| N | $C_nH_{2n+1}$ | CN | H | H | H |
| nN.F | $C_nH_{2n+1}$ | CN | H | H | F |
| nN.F.F | $C_nH_{2n+1}$ | CN | H | F | F |
| NF | $C_nH_{2n+1}$ | F | H | H | H |
| NOF | $OC_nH_{2n+1}$ | F | H | H | H |
| nF.F | $C_nH_{2n+1}$ | F | H | H | F |
| NmF | $C_nH_{2n+1}$ | $C_mH_{2m+1}$ | F | H | H |
| $NOCF_3$ | $C_nH_{2n+1}$ | $OCF_3$ | H | H | H |
| n-Vm | $C_nH_{2n+1}$ | —CH=CH—$C_mH_{2m+1}$ | H | H | H |
| nV-Volume | $C_nH_{2n+1}$—CH=CH— | —CH=CH—$C_mH_{2m+1}$ | H | H | H |

The TN and STN displays preferably contain liquid-crystalline mixtures composed of one or more compounds from Tables A and B.

TABLE A
($L^1$, $L^2$, $L^3$ = H or F)
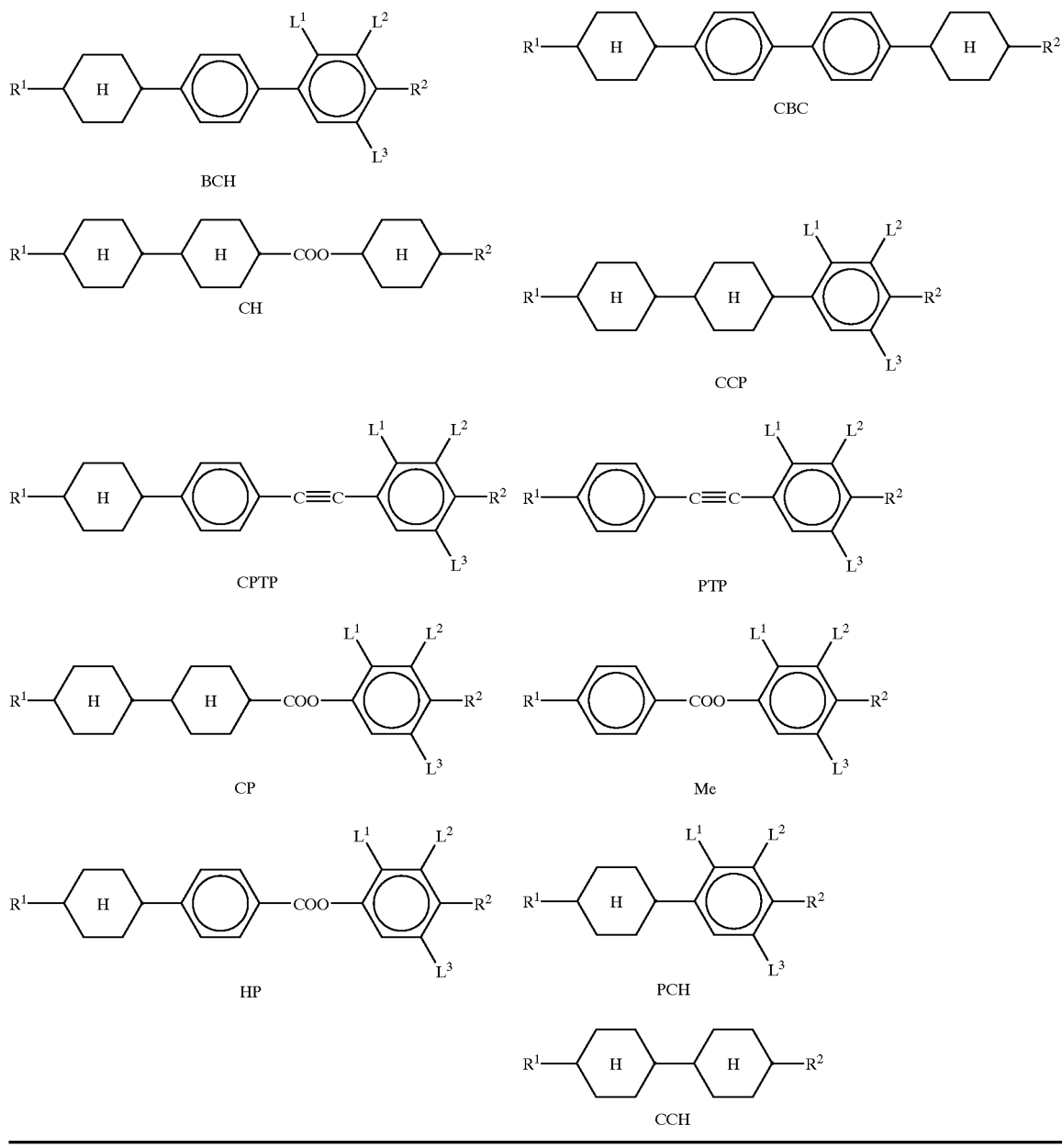
TABLE B
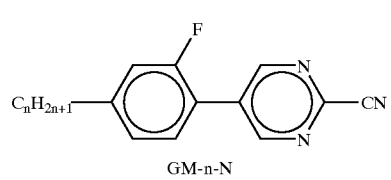
GM-n-N
TABLE B-continued
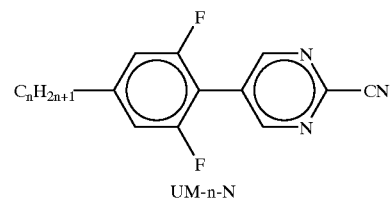
UM-n-N

TABLE B-continued

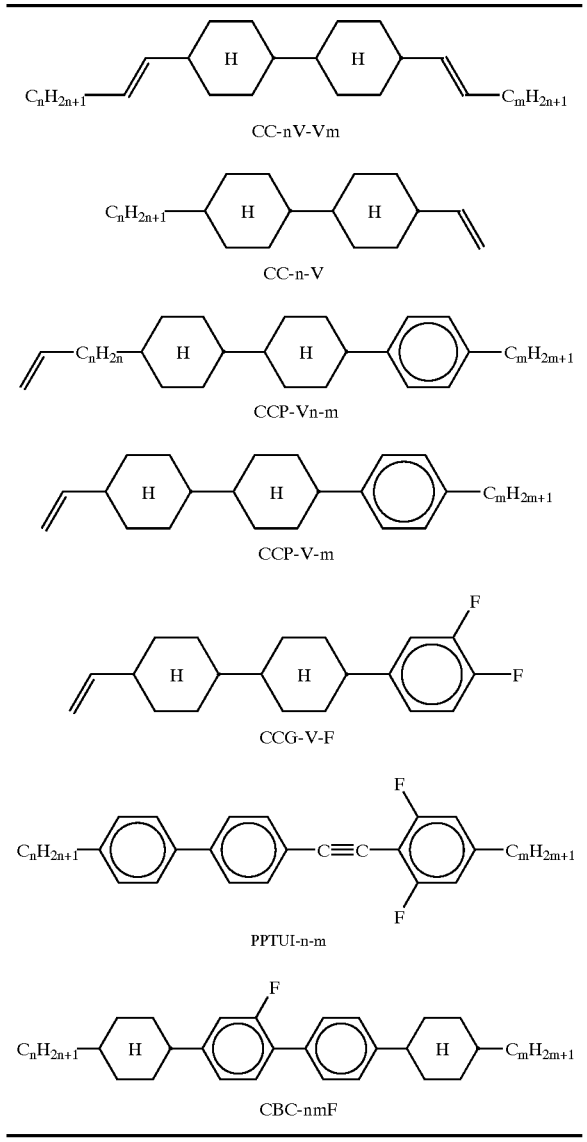

The following examples are intended to illustrate the invention without re-resenting a limitation. The following abbreviations are used:

cl.p. clearing point (nematic-isotropic phase transition temperature),
S-N smectic-nematic phase transition temperature,
visc. flow viscosity (at 20° C. unless stated otherwise),
$\Delta n$ optical anisotropy (589 nm, 20° C.)
$n_o$ ordinary refractive index (589 nm, 20° C.)
$\Delta\epsilon$ dielectric anisotropy (1 kHz, 20° C.)
$\epsilon_{TM}$ dielectric constant perpendicular to the longitudinal molecular axis (1 kHz, 20° C.)
$\gamma_1$ rotational viscosity
S characteristic line steepness=$V_{90}/V_{10}$
$V_{10}$ threshold voltage=characteristic voltage at a relative contrast of 10%,
$V_{90}$ characteristic voltage at a relative contrast of 90%,
t $t_{on}+t_{off}$ (total response time),
$t_{on}$ time from switching on until 90% of the maximum contrast is achieved,
$t_{off}$ time from switching off until 10% of the maximum contrast is achieved,
mux multiplex rate
$t_{store}$ low-temperature storage stability in hours (-20° C., -30° C., -40° C.)

Above and below, all temperatures are given in ° C. The percentages are percent by weight. All values relate to 20° C., unless stated otherwise. The displays are addressed, unless stated otherwise, at a multiplex rate of 1/48 and a bias of 1/7. The twist is 240° C., unless stated otherwise.

Comparative Example 1

| A TN and STN mixture consisting of | | | |
|---|---|---|---|
| ME2N.F | 6.00% | cl.p.: | 86.0° C. |
| ME3N.F | 6.00% | $\Delta n$: | 0.1367 |
| ME4N.F | 10.00% | $n_o$: | 1.4961 |
| ME5N.F | 9.00% | $\Delta\epsilon$: | 24.3 |
| PCH-3N.F.F | 13.00% | $\epsilon_\perp$: | 7.1 |
| CC-5-V | 10.50% | $V_{10}$: | 1.15 V |
| CCG-V-F | 21.00% | S: | 1.067 |
| CCPC-33 | 4.00% | t: | 580 ms |
| CCPG-34 | 4.00% | | |
| CBC-33F | 4.00% | | |
| CPTP-301 | 4.50% | | |
| CPTP-302 | 4.00% | | |
| CPTP-303 | 4.00% | | |

Example 1

| A TN and STN mixture consisting of | | | |
|---|---|---|---|
| ME2N.F | 6.00% | cl.p.: | 84.5° C. |
| ME3N.F | 6.00% | $\Delta n$: | 0.1365 |
| ME4N.F | 12.00% | $n_o$: | 1.4948 |
| A | 9.00% | $\Delta\epsilon$: | 25.6 |
| PCH-3N.F.F | 13.00% | $\epsilon_\perp$: | 7.2 |
| CC-5-V | 9.00% | $V_{10}$: | 1.05 V |
| CCG-V-F | 21.00% | S: | 1.057 |
| CCPC-33 | 4.00% | t: | 600 ms |
| CCPC-34 | 4.50% | | |
| CBC-33F | 4.50% | | |
| CPTP-301 | 4.00% | | |
| CPTP-302 | 4.00% | | |
| CPTP-303 | 3.00% | | | in which A is a compound of the following formula:

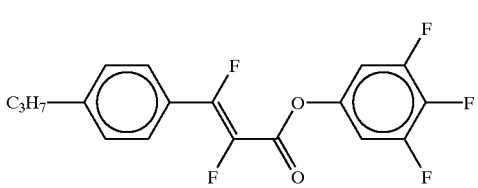

has a significantly reduced threshold voltage $V_{10}$ and an improved steepness compared with the mixture from Comparative Example 1, with only slightly changed values for the clearing point and response time.

Example 2

A TN and STN mixture consisting of

| A TN and STN mixture consisting of | | | |
|---|---|---|---|
| ME2N.F | 5.00% | cl.p.: | 90.0° C. |
| ME3N.F | 5.00% | Δn: | 0.1361 |
| ME4N.F | 9.00% | $n_o$: | 1.4936 |
| B | 9.00% | Δε: | 26.0 |
| PCH-3N.F.F | 13.00% | $\varepsilon_\perp$: | 6.8 |
| CC-5-V | 15.00% | $V_{10}$: | 1.10 V |
| CCG-V-F | 21.00% | S: | 1.042 |
| CCPC-33 | 4.00% | t: | 525 ms |
| CCPC-34 | 3.50% | | |
| CBC-33F | 4.00% | | |
| CPTP-301 | 4.00% | | |
| CPTP-302 | 4.00% | | |
| CPTP-303 | 3.50% | | | in which B is a compound of the following formula:

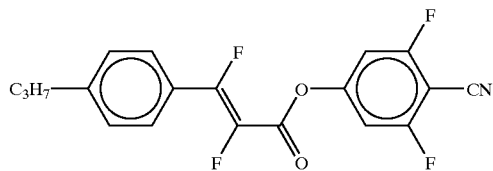

has a reduced threshold voltage $V_{10}$, a significantly improved steepness and a shortened response time and increased clearing point compared with the mixture from Comparative Example 1.

Comparative Example 2

A TN and STN mixture consisting of

| A TN and STN mixture consisting of | | | |
|---|---|---|---|
| ME2N.F | 4.25% | cl.p.: | 95.0° C. |
| ME3N.F | 4.25% | Δn: | 0.1370 |
| ME4N.F | 12.00% | $n_o$: | 1.4974 |
| ME5N.F | 7.00% | Δε: | 16.1 |
| CC-5-V | 19.50% | $\varepsilon_\perp$: | 5.1 |
| CCG-V-F | 20.00% | $V_{10}$: | 1.56 V |
| CCP-V-1 | 10.00% | S: | 1.079 |
| CCP-V2-1 | 4.50% | t: | 300 ms |
| CCPC-33 | 2.00% | | |
| CBC-33 | 2.00% | | |
| PTP-102 | 4.50% | | |
| CPTP-301 | 4.00% | | |
| CPTP-302 | 3.00% | | |
| CPTP-303 | 3.00% | | |

Example 3

A TN and STN mixture consisting of

| A TN and STN mixture consisting of | | | |
|---|---|---|---|
| ME2N.F | 4.25% | cl.p.: | 94.5° C. |
| ME3N.F | 4.25% | Δn: | 0.1380 |
| ME4N.F | 12.00% | $n_o$: | 1.4976 |
| ME5N.F | 7.00% | Δε: | 17.2 |
| CC-5-V | 15.50% | $\varepsilon_\perp$: | 5.4 |
| CCG-V-F | 20.00% | $V_{10}$: | 1.47 V |
| CCP-V-1 | 10.00% | S: | 1.092 |
| CCP-V2-1 | 4.00% | t: | 290 ms |
| CCPC-33 | 2.00% | | |
| CBC-33 | 2.00% | | |
| CPTP-301 | 3.00% | | |
| CPTP-302 | 3.00% | | |
| CPTP-303 | 3.00% | | |
| C | 10.00% | | | in which C is a compound of the following formula:

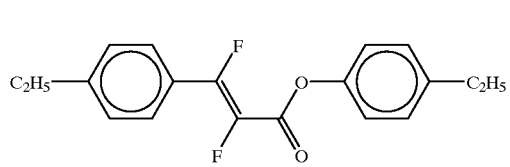

has a reduced threshold voltage $V_{10}$ and shorter response time than the mixture from Comparative Example 2, with retention of the high clearing point and only slightly changed steepness.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A TN or STN liquid-crystal display comprising:
   two outer plates, which, together with a frame, form a cell,
   a nematic liquid-crystal mixture of positive dielectric anisotropy located in the cell,
   electrode layers with alignment layers on the insides of the outer plates,
   a tilt angle between the longitudinal axis of the molecules at the surface of the outer plates and the outer plates of from 0 degree to 30 degrees, and
   a twist angle of the liquid-crystal mixture in the cell from alignment layer to alignment layer with a value of between 22.5° and 600°,
   the nematic liquid-crystal mixture comprising:
   a) 15–80% by weight of a liquid-crystalline component A consisting of one or more compounds having a dielectric anisotropy of greater than +1.5;
   b) 20–85% by weight of a liquid-crystalline component B consisting of one or more compounds having a dielectric anisotropy of from −1.5 to +1.5;
   c) 0–20% by weight of a liquid-crystalline component D consisting of one or more compounds having a dielectric anisotropy of below −1.5, and
   d) optionally, an optically active component C in such an amount that the ratio between the layer thickness, separation of the outer plates, and the natural pitch of the chiral nematic liquid-crystal mixture is from about 0.2 to 1.3,
   wherein the liquid-crystal mixture comprises at least one compound of the formula I

I

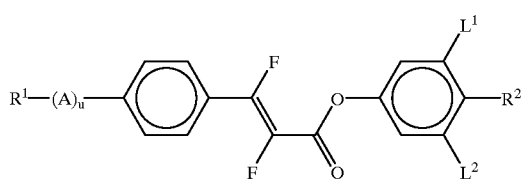

in which
- R¹ is an alkyl or alkenyl radical having 1 to 12 carbon atoms which is unsubstituted, monosubstituted by CN or $CF_3$ or monosubstituted to per halo-substituted by halogen, and in which, one or two $CH_2$ groups are optionally replaced by —O—, —S—,

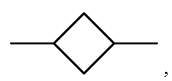

—CO—, —CO—O—, —O—CO— or —O—CO—O— in such a way that O atoms are not linked directly to one another,
- R² has one of the meanings indicated for R¹ or is X,
- X is F, Cl, CN, OCN, NCS, SCN or a halogenated alkyl, alkenyl, alkoxy or alkenyloxy radical having 1 to 6 carbon atoms,
- L¹ and L² are each, independently of one another, H or F, A is trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene or 1,3-dioxane-2,5-diyl, and
- u is 0 or 1, and wherein the nematic liquid crystal mixture further comprises at least one alkenyl compound of the formula II

II

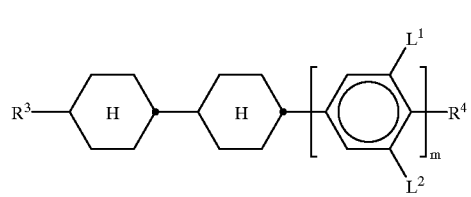

in which
- R³ is an alkenyl group having 2 to 7 carbon atoms,
- R⁴ has one of the meanings indicated for R¹ is or Q—Y,
- Q is $CF_2$, $OCF_2$, CFH, OCFH or a single bond,
- Y is F or Cl,
- L¹ and L² are each, independently of one another, H or F, and
- m is 0 or 1.

2. A liquid-crystal display according to claim 1 wherein the nematic liquid-crystal mixture contains at least one compound of the formula I in which X is F, CN, $OCF_3$ or $OCHF_2$, and L¹ and/or L² is F.

3. A liquid-crystal display according to claim 1, wherein the nematic liquid-crystal mixture contains at least one compound selected from the following formulae:

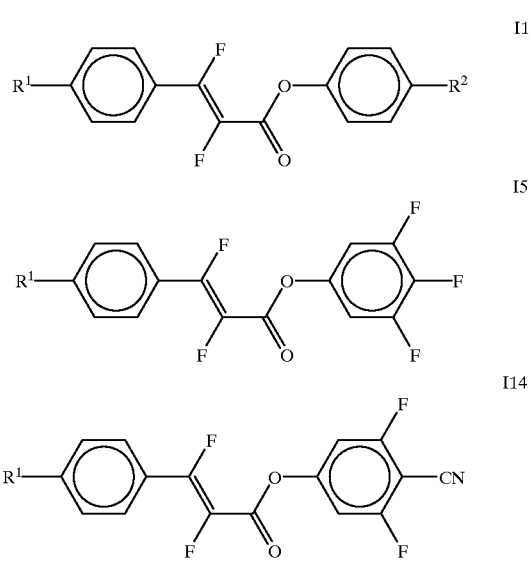

in which R¹ and R² are as defined in the formula I.

4. A liquid-crystal display according to claim 1, wherein component A of the nematic liquid-crystal contains one or more compounds of the following formulae:

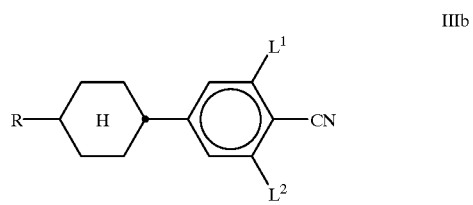

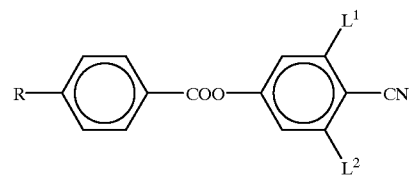

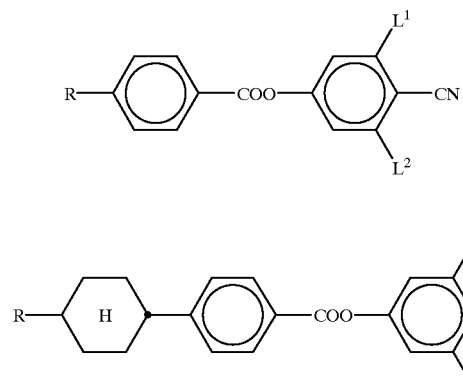

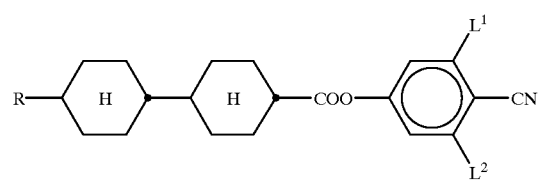

in which R has one of the meanings indicated for R¹ in formula I, and L¹ and L² are each, independently of one another, H or F.

5. A liquid-crystal display according to claim 1, wherein the nematic liquid-crystal mixture contains one or more compounds of the following formulae:

VI25

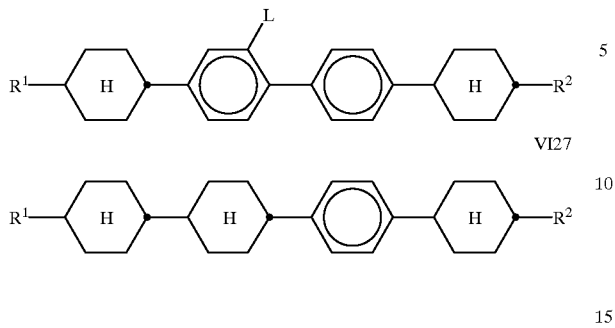

VI27 in which $R^1$ is as defined in the formula I, $R^2$ has one of the meanings indicated for $R^1$, and L is H or F.

6. A liquid-crystal display according to claim 1, wherein the nematic liquid-crystal mixture contains one or more tolan compounds selected from the following formulae:

T2a

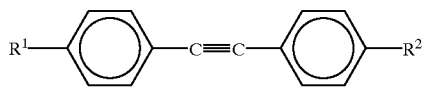

T2b

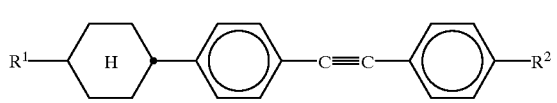

in which $R^1$ is as defined in the formula I, and $R^2$ has one of the meanings indicated for $R^1$.

7. A liquid-crystal display according to claim 1, wherein the nematic liquid-crystal mixture contains from 2 to 30% of one or more compounds of the formula I.

8. A liquid-crystal display according to claim 1, wherein the nematic liquid-crystal mixture contains from 15 to 70% of one or more compounds of the formula II.

9. A nematic liquid-crystal mixture comprising:

a) 15–80% by weight of a liquid crystalline component A consisting of one or more compounds having a dielectric anisotropy of greater than +1.5;

b) 20–85% by weight of a liquid-crystalline component B consiting of one or more compounds having a dialectric anisotropy of from –1,5 to +15;

c) 0–20% by weight of a liquid-crystalline component D consisting of one or more compounds having a dielectric anisotropy of below –1.5, and d) optionally, an optically active component c in such an amount that the ratio between the layer thickness, separation of the outer plates, and the natural pitch of the chiral nematic liquid-crystal mixture is from about 0.2 to 1.3, wherein the liquid-crystal mixture comprises at least one compound of the the formula I

I

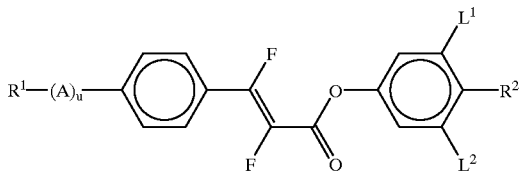

in which $R^1$ is an alkyl or alkenyl radical having 1 to 12 carbon atoms which is unsubstituted, monosubstituted by CN or $CF_3$ or monosubstituted to per halo-substituted by halogen, and in which, one or two $CH_2$ groups are optionally replaced by —O—, —S—,

—CO—, —CO—O—, —O—CO— or —O—CO—O— in such a way that O atoms are not linked directly to one another, $R^2$ has one of the meanings indicated for $R^1$ or is X, X is F, Cl, CN, OCN, NCS, SCN or a halogenated alkyl, alkenyl, alkoxy or alkenyloxy radical having 1 to 6 carbon atoms, $L^1$ and $L^2$ are each, independently of one another, H or F, A is trans-1,4-cyclohexylene, 1,4-phenylene, 2-fluoro-1,4-phenylene, 3-fluoro-1,4-phenylene, 2,3-difluoro-1,4-phenylene, 3,5-difluoro-1,4-phenylene or 1,3-dioxane-2,5-diyl, and u is 0 or 1, and wherein the nematic liquid crystal mixture further comprises at least one alkenyl compound of the formula II

II

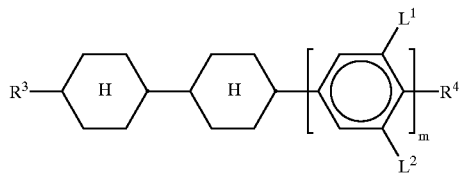

in which $R^3$ is an alkenyl group having 2 to 7 carbon atoms, $R^4$ has one of the meanings indicated for $R^1$ or is or Q—Y, Q is $CF_2$, $OCF_2$, CFH, OCFH or a single bond, Y is F or Cl, $L^1$ and $L^2$ are each, independently of one another, H or F, and m is 0 or 1.

10. A liquid-crystal mixture according to claim 9 wherein the nematic liquid-crystal mixture contains at least one compound of the formula I in which X is F, CN, $OCF_3$ or $OCHF_2$, and $L^1$ and/or $L^2$ is F.

11. A liquid-crystal mixture according to claim 9, wherein the nematic liquid-crystal mixture contains at least one compound selected from the following formulae:

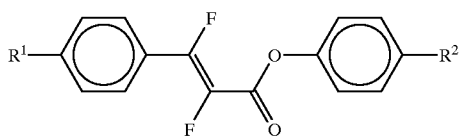

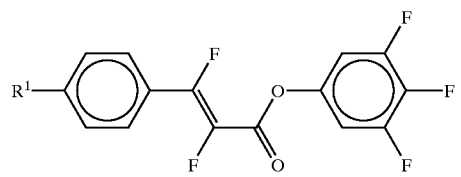

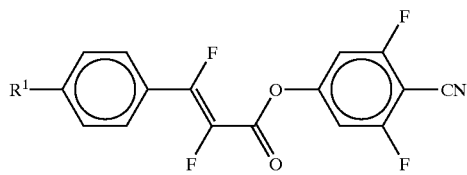

in which $R^1$ and $R^2$ are as defined in the formula I.

12. A liquid-crystal mixture according to claim 9, wherein component A of the nematic liquid-crystal contains one or more compounds of the following formulae:

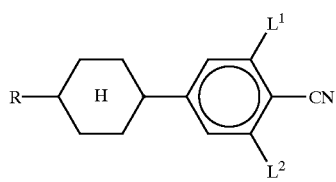

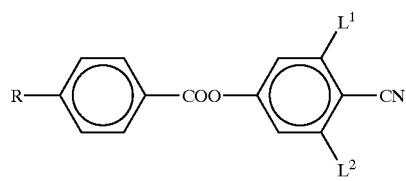

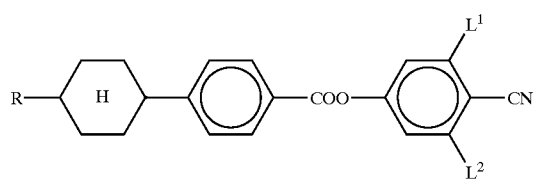

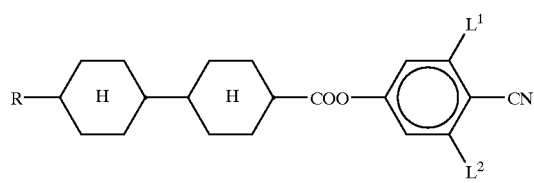

in which R has one of the meanings indicated for $R^1$ in formula I, and $L^1$ and $L^2$ are each, independently of one another, H or F.

13. A liquid-crystal mixture according to claim 9, wherein the nematic liquid-crystal mixture contains one or more compounds of the following formulae:

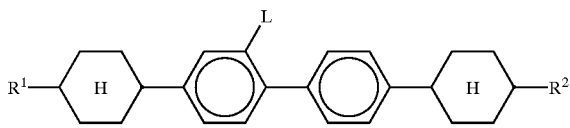

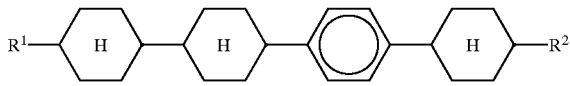

in which $R^1$ is as defined in the formula I, $R^2$ has one of the meanings indicated for $R^1$, and L is H or F.

14. A liquid-crystal mixture according to claim 9, wherein the nematic liquid-crystal mixture contains one or more tolan compounds selected from the following formulae:

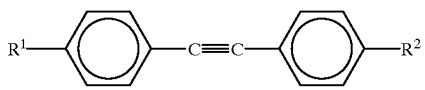

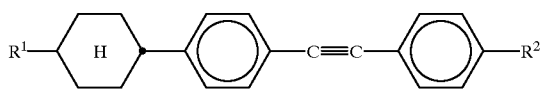

in which $R^1$ is as defined in the formula I, and $R^2$ has one of the meanings indicated for $R^1$.

15. A liquid-crystal mixture according to claim 9, wherein the nematic liquid-crystal mixture contains from 2 to 30% of one or more compounds of the formula I.

16. A liquid-crystal mixture according to claim 9, wherein the nematic liquid-crystal mixture contains from 15 to 70% of one or more compounds of the formula II.

17. The nematic liquid-crystal mixture of claim 9, which contains at least one compound of the formula I in which u is 0.

18. The nematic liquid-crystal mixture of claim 9, which contains at least one compound of the formula I in which $L^1$ and $L^2$ are H and $R^2$ is a straight chain alkyl or alkoxy having 1 to 8 carbon atoms.

* * * * *

UNITED STATES PATENT AND TRADEMARK OFFICE
CERTIFICATE OF CORRECTION

PATENT NO. : 6,555,186 B2
DATED : April 29, 2003
INVENTOR(S) : Hirschmann et al.

It is certified that error appears in the above-identified patent and that said Letters Patent is hereby corrected as shown below:

<u>Column 29,</u>
Line 55 reads "-1,5 to +15;" should read -- -1.5 to +1.5; --

Signed and Sealed this

First Day of June, 2004

JON W. DUDAS
*Acting Director of the United States Patent and Trademark Office*